Feb. 6, 1923.
M. B. BOYD.
AEROPLANE.
FILED NOV. 27, 1918.
1,444,058
5 SHEETS-SHEET 1
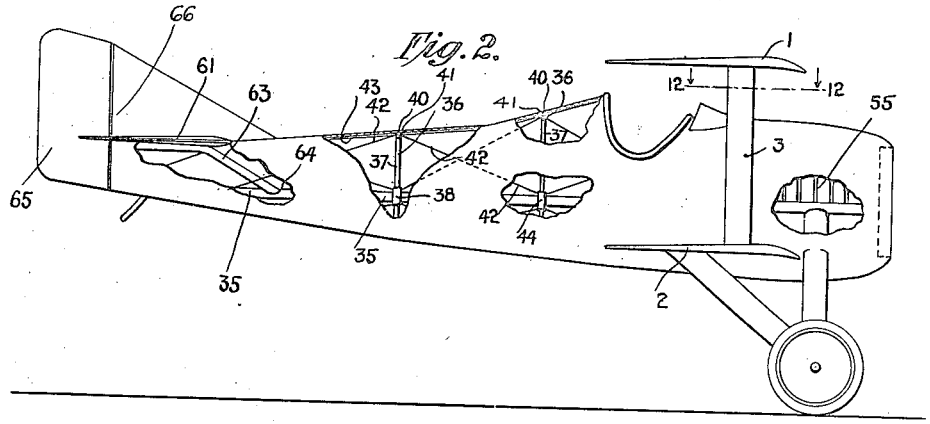

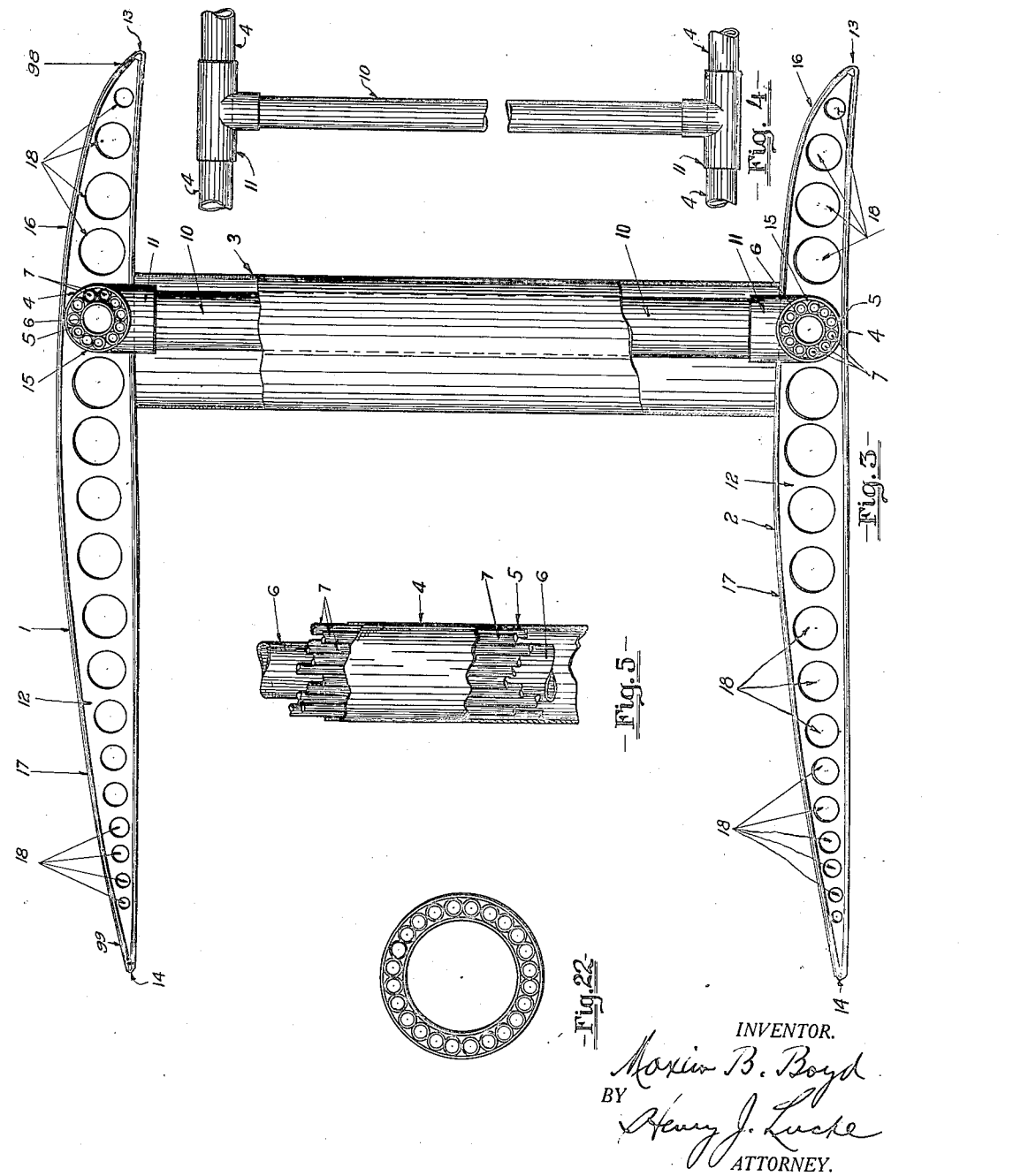

Feb. 6, 1923.

M. B. BOYD.
AEROPLANE.
FILED NOV. 27, 1918.

INVENTOR.
Marvin B. Boyd
BY
Henry J. Lucke
ATTORNEY.

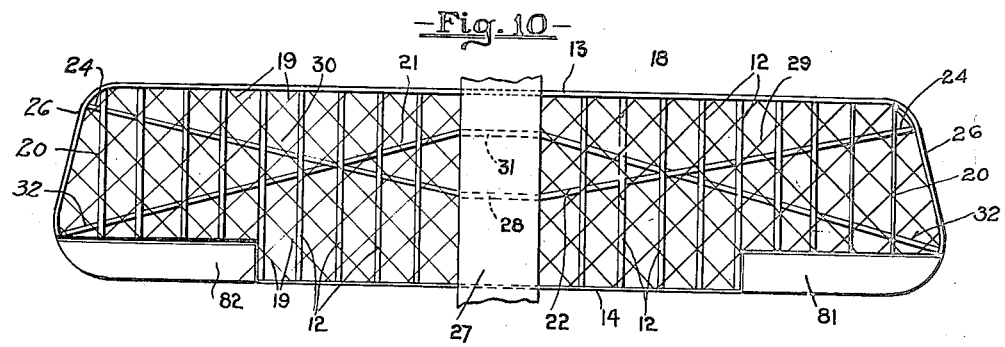
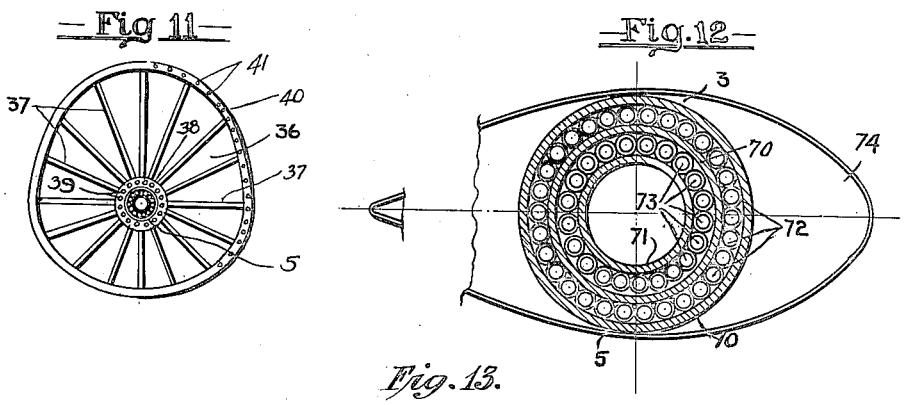
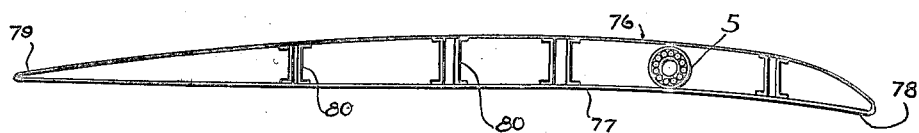
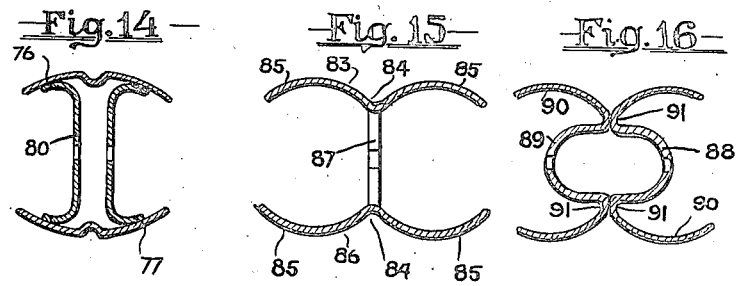

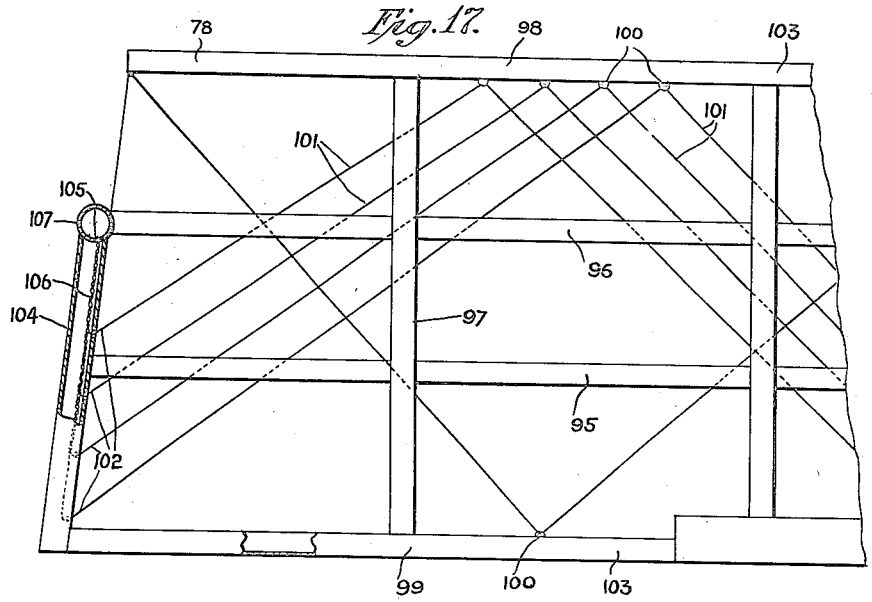
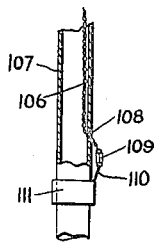
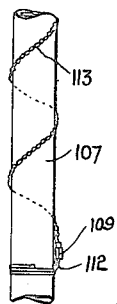
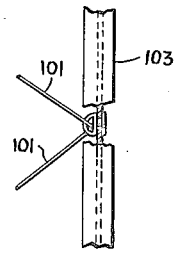
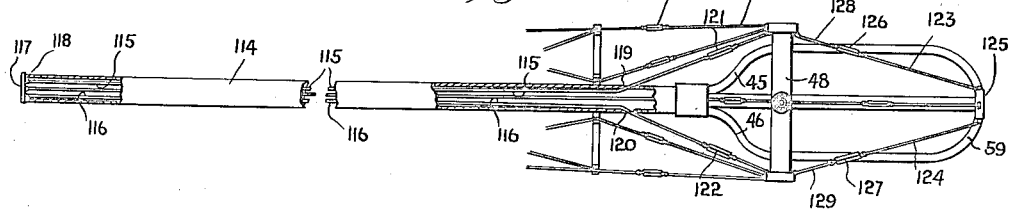

Patented Feb. 6, 1923.

1,444,058

UNITED STATES PATENT OFFICE.

MAXIM B. BOYD, OF NEW YORK, N. Y.

AEROPLANE.

Application filed November 27, 1918. Serial No. 264,323.

*To all whom it may concern:*

Be it known that I, MAXIM B. BOYD, a citizen of the United States of America, residing at borough of Manhattan, city, county, and State of New York, have invented certain new and useful Improvements in Aeroplanes, of which the following is a specification.

This invention relates to airplanes.

More particularly, the invention pertains to constructional features affording the use of steel, acierial and other metallic materials, resulting in a part or whole metal machine.

Further features of the invention relates to the construction and arrangement of interconnecting members for attaining greatly improved rigidity combined with decreased over-all dead weight of the airplane. Preferably such construction and arrangement comprises a "back-bone" of composite tube construction of metallic or non-metallic material, including an outer tube of relatively large diameter enclosing an inner tube of relatively smaller diameter and elements such as cylindrical tube or rods or otherwise curved or corrugated separators serving to hold such outer and inner tube in retained spaced positions. To such backbone is welded or otherwise secured circular, oval or otherwise curved tubes serving as spokes to circular rims or annulæ provided with openings or other recesses adjacent the periphery, through which recesses extend wires or strands or cables or equivalent bracing and stress distributing means. Such cables or wires may also extend through openings located within hubs or collars of relatively small diameter welded directly to the backbone and spaced along the length of the backbone, thereby effecting a truss formation from one end of the backbone to the other.

Such composite tube arrangement may also be employed in the construction of the vertical pillars between one plane and another plane, in the bi-planer type, or generally for any pillar between a plane and any other sustaining portion of the airplane generally.

Such composite tube construction may also be utilized for the wing bone of the respective planes and may be combined with ribs extending from such wing bones and provided with recesses, and wires or cables passing through such recesses and connecting such ribs and preferably combined with each wing-bone, in spaced truss formation.

Means are provided for supporting the engine or engines and the one or more propellers in rigid relation to such main backbone of the airplane. The main backbone construction embodying the composite tubular arrangement is advantageously utilized in forming the outer contour of the fuselage, as by stringing wires through suitable peripheral recesses of the circular rims to form a wire mesh support for linen or other fabric, sheet steel or other rigid material serving as the outer surface material of the fuselage.

Further features and objects of the invention will be more fully understood from the following description and the accompanying drawings, in which Fig. 1 is a top plan view of one embodiment of my invention;

Fig. 2 is a side elevation of the same, partly broken away to indicate certain interior construction;

Fig. 3 is a sectional elevation on line 3—3 of Fig. 1;

Fig. 4 is a detail elevation of a portion of Fig. 3, viewed in a direction normal to that of Fig. 3;

Fig. 5 is a detail elevation of a portion of a composite tube member; broken away to show inner elements of the member;

Fig. 10 is a top plan view of a modified form of wing, with the outer linen or fabric covering removed;

Fig. 11 is a sectional elevation on line 11—11 of Fig. 1;

Fig. 12 is a detail sectional elevation on line 12—12 of Fig. 2 on a somewhat enlarged scale but showing a modification;

Fig. 13 is a side elevation of a modified form of rib;

Fig. 14 is a detail sectional elevation of Fig. 13;

Figs. 15 and 16 are sectional elevations similar to Fig. 14, showing further modifications;

Fig. 17 is a detail plan of a modified form of wing structure.

Figs. 18 and 19 are detail elevations, the former partly in cross-section, showing respectively different modifications of parts of Fig. 17;

Fig. 20 is detail plan of a part of Fig. 17;

Fig. 21 is a plan, partly in cross-section, of a modified form of back-bone of composite tube construction; and Fig. 22 is an end elevation of Fig. 5.

Figure 6:
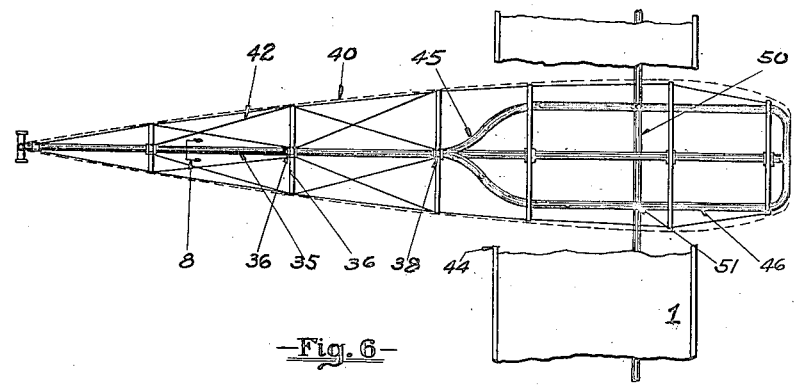
Fig. 6 is a top plan view of the skeleton of the construction of Figs. 1 and 2.

Referring to the embodiment of my invention shown in Figs. 1 and 2, of a bi-plane type, the aeroplane of my invention comprises the upper plane 1 and lower plane 2, respectively extending from tip to tip of the air plane generally. Toward the outer end portions of the planes 1, 2, the same are held in spaced sustaining positions by the pillars or struts 3 as also indicated in Fig. 3.

Extending longitudinally of the respective planes 1, 2, are arranged the composite tube members 4, serving as the wing beam. Such composite tube members 4 may be of the form indicated at Fig. 5, comprising the outer tube 5 of relatively large inner diameter, the relatively small tube 6 enclosed therein and the cylindrical or otherwise curved tubes 7 disposed between said outer tube 5 and said inner tube 6.

Said outer tube 5 and said inner tube 6 are preferably of drawn steel and of corresponding and preferably symmetrical contours. The intermediately disposed elements 7 are preferably also of drawn steel. In the employment of the term "steel", I include steel alloys such as vanadium steel, tungsten steel, and the like as well as the various forms of steel per se, although metallic or non-metallic material having characteristics of comparable strength and qualities affording similar shaping in manufacture and assembly may be used in equivalency of steel, the determination of the specific material or materials to be employed in any particular airplane being dependent upon the requirements of the airplane, other than rigidity and lightness in planing, such as invulnerability against shell or other missiles, proof against corrosion of sea water and other important subsidiary requirements.

Figure 8:
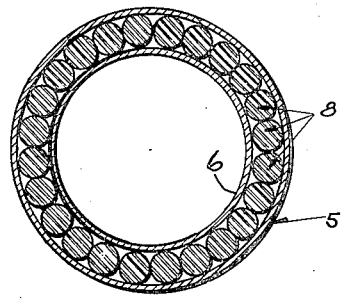
Fig. 8 is a sectional elevation on line 8—8 of Fig. 6.
Figure 9:
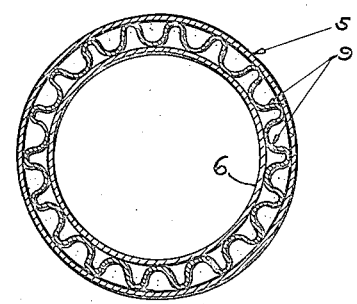
Fig. 9 is a sectional elevation similar to Fig. 8 but showing a modification.

In Fig. 8, I have indicated such composite tube member as comprising the annularly disposed elements 8 in the form of solid bars, in which embodiment the inner tube 6 may be of relatively larger inner and outer diamters. In Fig. 9, a further modification, the inner tube 6 is spaced from the outer tube 5 by the elements 9 comprising corrugations of sheet steel or equivalent material, positioned and retained in contacting engagement respectively of the inner face of the outer tube 5 and the outer face of the inner tube 6.

Returning to Figs. 3 and 4, and also Figs. 1 and 2, the planes 1, 2 are connected in sustaining spaced positions by the one or more pillars 10 of similar composite tube construction, as aforesaid. Such intermediate pillars 10 surrounded by the casing 3 may be connected with the respective wing-beams 4 as by means of the T's 11, each T having its arms respectively welded or otherwise affixed to the respective outer tube 5 of such beams or wing-bones 4.

The wing per se may be further supported by the ribs 12, extending longitudinally of the wing, such ribs 12 being spaced apart in the direction of length of the wing. As indicated in Fig. 3, each rib 12 may be of sheet steel, or equivalent material, coextensive from the loading edge 13 of the plane to the trailing edge 14, and provided with a main recess or perforation 15 through which is received the composite wing-beam 4, to permit a welded or other substantially rigid connection therewith. As is also indicated in Fig. 3, each such rib 12 may be formed of the anterior portion 16 separate from the posterior portion 17 and such portions 16, 17 welded to the outer tube 5 of such composite beam 4.

The respective ribs 12 are provided with the cut-away portions or openings 18 to reduce as desired the aggregate dead weight but insuring sufficient strength of the individual ribs at their particular positions relative to the respective tips of the wing. It will be noted, as indicated in Fig. 3, that such openings or cut-away portions 18 are of relatively larger extent in the portions of the plane centrally of the leading and trailing edges of the plane, as compared with such openings or cut-away portions adjacent the leading and trailing edges, and may be varied progressively as indicated.

As shown in Fig. 13 such openings 18 may serve the additional function of receiving and yieldingly retaining the wires 19 laced therethrough and interlacing the ribs 12 with one another. Such wires may be of steel, such as steel piano wire, or equivalent. One end of each wire 19 may be secured to any rib 12, but preferably to an outermost rib, as indicated at 20, adjacent the tip of the wing, and the other end anchored to a suitable, fixed anchorage as to the exterior of a main pillar 3, or to the exterior of an intermediate pillar 10, either directly or by being passed through the interior of the inner tube 6 for a certain length thereof and then fastened out exteriorly of the outer tube 5 thereof.

In the modification shown in Fig. 10, the set of composite tubular beams 21, 22 are arranged to overlap one another in mutually bracing relation, as indicated, the outermost ends 24, 24, of the beams 22 being welded or otherwise anchored to the outermost ribs 26, 26 and respectively centrally supported by the canopy portion 27 of the plane. As indicated, the beams 22 may have the central portion 28 thereof extending substantially parallel to the general direction of length of the plane 20 and oppositely disposed and the oppositely angularly directed portions 29, 30 extending toward the leading edge 13 of the wing. Similarly, the beams 21 may be provided with the similar central portion 31 and the similarly rearwardly directed angular portions 32, 32.

Figure 7:
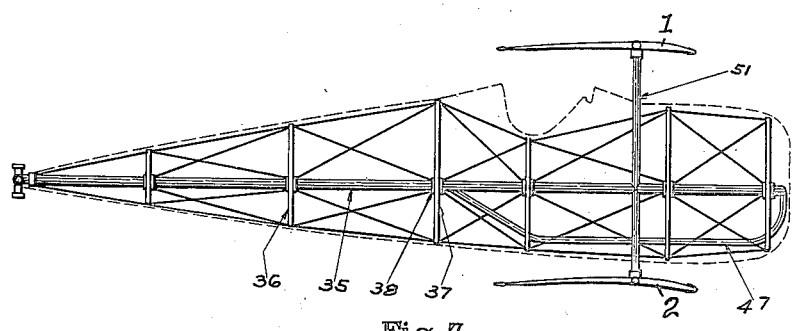
Fig. 7 is a side elevation of Fig. 6.

The backbone embodying the principles of my invention is indicated in Figs. 1 and 2, in one modification, and in Figs. 6 and 7 in another modification. Such backbone arrangement as indicated in Figs. 8 and 9 embodies an exterior tube 5 of cylindrical or other suitably curved formation, as aforesaid, an inner correspondingly curved tube 6 and annularly disposed elements 8, as aforesaid. Such backbone construction is indicated at 35 in Figs. 1 and 2. At suitably spaced locations are disposed the spiders 36 and anchored to such backbone by welding the spider arms or tension spokes 37 to the hub 38, in turn welded to the outer tube of the backbone 35.

Each spider 36 at its circumferential or peripheral portions is formed of a flat or annular ring 40 having circumferentially spaced openings 41, through which are laced the wires 42 thus interlacing the respective spiders 36 with one another. Preferably, such wires 42 are passed also through the openings 39 of the hubs of the alternate spiders 36, see Fig. 11. One end of each wire 42 may be anchored at the respective ends of the backbone 35, or otherwise secured to a fixed anchorage.

As indicated in Figs. 1 and 2, spiders 36 may be of progressively varying diameters in conformity to the spaced line contour of the fuselage, and may be circular or, as indicated of suitable elliptical or other curved shape, according to the shape of the body of the fuselage.

Through such peripheral openings 41 in the respective rings 40 are strung wires 43 of relatively small diameter to form a resulting wire mesh, to which linen, cloth, or other fabric or sheets of steel or other metal are attached to serve as the outer surface material of the fuselage.

Such composite backbone 35 serves also to support the one or more seats for the pilot, aviator or observer, as is indicated in Figs. 1, 2, 6, 7, the said specific construction embodying the collar 44 welded about the end of the backbone 35, to which collar is welded or otherwise affixed two or more arms, shown as three in number, 45, 46, 47, to which the base 48 of the pilot seat 49 is secured. Preferably the base 48 is directly affixed to a cross arm or span 50 having its ends welded to the ends of the respective arms 45, 46.

The wires 42 of the composite tube truss formation may be adjusted in tension individually by means of turn-buckles 42ª, or equivalent.

In the modification shown in Figs. 6, 7, the intermediate pillar 51, preferably of composite tubular construction as aforesaid, is welded to the back-bone 35 and is connected at its ends to the wing-beams of the upper and lower wings 1, 2. There are two such intermediate pillars 51, and the intersecting points at which they are thus welded to the back-bone 35 is shown in Fig. 6 of the drawings.

The motor 55, see Fig. 2, is preferably supported in rigid relation with the said backbone 35, as by extending the said arms 45, 46, 47 forwardly to form a cradle for the support of the motor base.

The horizontal left hand and right hand stabilizers 60, 61, are preferably similarly supported from the backbone 35, as by means of the lateral bent arms 62, 63, respectively welded at 64 to the outermost tube 5 of the backbone. The horizontal stabilizers 60, 61 are respectively pivotally mounted on the free ends of the arms 62, 63 and controlled in any approved manner. The rudder 65 is similarly suitably pivotally supported on the fin 66 carried by the backbone 35. The elevators 67, 68 are mounted and controlled in any suitable manner.

As indicated in Fig. 12, the main pillar 3 may comprise a plurality of inner tubes and in the particular embodiment illustrated I have indicated two inner tubes 70, 71 of correspondingly reduced diameters within the outermost tube 5. The intermediately disposed sets of spacing elements 72, 73 are equivalent to the aforesaid spacing elements 7 in Fig. 5, or the bars 8, as shown in Fig. 8, or the corrugated sheet arrangement 9 as shown in Fig. 9. The pillar 3 may be provided with the forward and rearwardly extending sheet members 74, 74 for the purpose of reducing the air resistance.

As indicated in Fig. 13, and Fig. 14, each rib of the wings may be formed of upper and lower sheet members 76, 77, welded together at the leading edge 78 and similarly at the trailing edge 79 and spaced apart by means of the spacing tools 80, having their upper and lower flanges welded to the surfaces of said sheets 76, 77.

The wings may be provided with the ailerons 81, 82, as will be understood.

In Fig. 15, the upper member 83 corresponds to the sheet member 76, but braced to have the central curved portion 84, and the outer curved edges 85, and to have the lower sheet member 86, and the spacing sheets 87 spotwelded to the said curved portions 84, 84 of the respective upper and lower sheet members 83, 86.

In Fig. 16, I have shown another form of wing rib comprising a pair of sheet forms 88, 89 having central outwardly bulged portions and curved end portions 90, with intermediate intra-extending portions 91, 91 spotwelded respectively to one another.

In Fig. 17, I have indicated another form of wing supporting arrangement comprising a plurality of wing-bones 95, 96, preferably of composite tube construction, to which are affixed the transversely extending ribs 97, as aforesaid. The leading edge 78 is preferably of bent metal, of thin acieral or the like, and similarly for the trailing edge 99.

Such edge member 98, 99 is provided with eyelet elements 100, for receiving the wires 101, as indicated in Fig. 17, the one ends of which wires are fixed in the eye-let elements 102, secured to the edge plate or metal shape 103, as shown in Fig. 20.

Such wires 101, are thus fixedly connected at their one ends respectively to the wing-bone 95, 96 or wing-bones, i. e., to the edge plate 103 and strung in mesh relation over such wing-bone or wing-bones through the sets of eye-let members 100, and the other end portions 102 passed through the series of openings 18 in any rib—say adjacent the fuselage, as the rib 104, such end portions 102 may be wound about one another to form a composite wire of cable 106 and then passed through the opening 105 downwardly through the intermediate strut 107, preferably of composite tubular construction as the strut 10, as aforesaid. The wire or cable end portions 106, passing downwardly through the strut 107, as shown in Fig. 18, may emerge through the opening 108 and be connected to the turn-buckle 109, suitably anchored, say to the wire 110, fixed to the collar 111, welded or otherwise fixed to the strut 107.

In Fig. 19, I have shown the turn-buckle 109, anchored to one end of the wire or cable 112, whose other end is wound about in fixed relation to the strut 107. Also, as shown in Fig. 19, I have shown the wire or cable end portion 113, similar to the wire or cable end portion 106, as aforesaid, wound spirally about the strut 107 and its end connected to the turn-buckle 109, this being an alternative method of extending the wire or cable 106 downwardly along the strut 107 by which the necessity of providing holes in said strut is obviated. Such wire or cable arrangement may be similarly applied to the back-bone 114, similar to the back-bone 35, as aforesaid, by anchoring the one ends respectively of the plurality of wires or cables 115, 116, etc., to the plate 117, held against the stern end 118 of the back-bone 114, passing said wires or cables 115, 116 through the interior of the back-bone 114, emerging at any desired locations through the openings 119, 120 and connected to the respective turn-buckles 121, 122, arms 45, 46 of the cradle supporting the cross-arm 48, as aforesaid. Similarly, the wire or cables 123, 124 are respectively connected to the nose 125, of the curved nose portion 59, of the cradle supporting the engine 55, see Fig. 1, and respectively connected to the turn-buckle 126, 127 in turn connected by the wires 128, 129 to the aforesaid arms 45, 46.

The turn-buckles are independently adjusted in tightening position to proper tensions of the wires or cables, combinedly to attain the desired distribution of the strains.

As indicated above, such wire or cable construction in combination with the tubular supporting back-bone or wing-bones, or other relatively rigid supporting member, effects an equalization of the stresses and strains to which each such rigid member is subjected, such equalizing effect being attained particularly advantageous when the airplane is in flight, i. e., under varying air pressures on the sustaining supporting and interconnecting portions. Such construction is further advantageous in the event of fracture or breakage of any sustaining or supporting or interconnecting portion and serves to hold the parts together in operative relation.

I claim.

1. A supporting element for an airplane, comprising a hollow tube, arms fixed to said tube, at spaced locations, said arms respectively having a set of recesses disposed adjacent said hollow tube and another set of recesses disposed remote from said hollow tube and wire extending through said recesses, and to said hollow tube at other spaced locations.

2. A supporting element for an airplane, comprising a hollow tube, arms fixed to said tube, at spaced locations, said arms respectively having a set of recesses disposed adjacent said hollow tube and another set of recesses disposed remote from said hollow tube and wire extending through alternate sets of said recesses, and to said hollow tube at locations other than said spaced locations.

3. A supporting element for an airplane comprising a substantially rigid member, a plurality of transversely extending members and respectively provided with recesses and a yielding element connected to said substantially rigid member and passing through certain of said recesses in yielding contact with said transverse members and means for maintaining substantially uniform tension throughout the length of said yielding element.

4. An airplane comprising a substantially rigid member, a plurality of members extending transversely to said rigid member and connected thereto at spaced regions, said transverse members being provided with recesses and a yielding element connected to said substantially rigid member and passing through certain of said recesses and in sliding contacting engagement with said transverse members and means for maintaining substantially uniform tension throughout the length of said yielding element.

5. A supporting element for an airplane comprising a substantially rigid member, a plurality of transversely extending members connected to said substantially rigid member at spaced locations and provided with recesses and a yielding element connected to said substantially rigid member and passing through certain of said recesses in yielding contact with said transverse members and means for maintaining substantially uniform tension throughout the length of said yielding element.

6. A tension element for an aeroplane comprising a tubular member, a second tubular member of less diameter and disposed within said first named tubular member and a plurality of elements of curved outer periphery contacting exteriorly with one another and located between the inner face of said first named tubular member and the outer face of said second named tubular member.

7. A tension element for an aeroplane comprising a tubular member, a second tubular member of less diameter and disposed within said first named tubular member and a plurality of elements of circularly curved outer periphery contacting exteriorly with one another and located between the inner face of said first named tubular member and the outer face of said second named tubular member.

8. A tension element for an aeroplane comprising a tubular member, a second tubular member of less diameter and disposed within said first named tubular member and a plurality of hollow elements of circularly curved outer periphery contacting exteriorly with one another and located between the inner face of said first named tubular member and the outer face of said second named tubular member.

In testimony whereof I have signed this specification this 29th day of October 1918.

MAXIM B. BOYD.